United States Patent
Heilig et al.

(10) Patent No.: US 7,487,057 B2
(45) Date of Patent: Feb. 3, 2009

(54) FIELD DEVICE ELECTRONICS WITH A SENSOR MECHANISM FOR PROCESS MEASUREMENT

(75) Inventors: Clemens Heilig, Offenburg (DE); Roland Dieterle, St. Georgen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 143 days.

(21) Appl. No.: 10/497,544

(22) PCT Filed: Nov. 30, 2002

(86) PCT No.: PCT/EP02/13536
§ 371 (c)(1),
(2), (4) Date: Feb. 25, 2005

(87) PCT Pub. No.: WO03/054489
PCT Pub. Date: Jul. 3, 2003

(65) Prior Publication Data
US 2005/0140522 A1   Jun. 30, 2005

(30) Foreign Application Priority Data
Dec. 12, 2001 (DE) ................................. 101 61 071

(51) Int. Cl.
*G01F 23/00* (2006.01)
*G06F 17/40* (2006.01)
(52) U.S. Cl. ..................... 702/106; 702/127; 702/55; 73/290 R; 73/291
(58) Field of Classification Search ............. 702/106, 702/72, 75, 76, 124, 45, 50, 54–56, 80, 127; 73/861.22, 861.28, 1.73, 290 R, 291; 375/269, 375/273, 279, 308, 323, 329; 340/612, 618, 340/620
See application file for complete search history.

(56) References Cited

U.S. PATENT DOCUMENTS 4,372,166 A * 2/1983 Loveland ................. 73/861.28

(Continued)

FOREIGN PATENT DOCUMENTS

DE        10037996        2/2002

(Continued)

OTHER PUBLICATIONS

The Closed Loop System of a Thermal Exciting Silicon Microstructure Resonator Pressure Sensor.

(Continued)

*Primary Examiner*—Hal D Wachsman
(74) *Attorney, Agent, or Firm*—Bacon & Thomas, PLLC

(57) ABSTRACT

A field device electronics with a sensor unit for process measurements, wherein the field device electronics is connected with the sensor unit over corresponding signal paths, and wherein the field device electronics receives analog measurement signals (S1) of the sensor unit and produces analog drive signals (S5) for the fundamental wave excitation of the sensor unit and transmits to the sensor unit. Present for producing the drive signal(S5) are an analog/digital converter, a digital phase shifter and a digital/analog converter, wherein the analog measurement signals (S1) are digitized by the analog/digital converter and forwarded to a digital phase shifter, and wherein the output signal (S4) of a phase shifter is converted by the digital/analog converter into the analog drive signal (S5) for the sensor unit.

3 Claims, 5 Drawing Sheets

U.S. PATENT DOCUMENTS

| | | | |
|---|---|---|---|
| 5,578,764 A * | 11/1996 | Yokoi et al. | 73/861.356 |
| 5,841,035 A * | 11/1998 | Andoh et al. | 73/861.22 |
| 5,844,491 A | 12/1998 | Getman | |
| 5,942,696 A * | 8/1999 | Kleven | 73/861.22 |
| 6,236,322 B1 | 5/2001 | Lopatin | |
| 6,389,891 B1 | 5/2002 | D'Angelico | |
| 6,480,812 B1 * | 11/2002 | Wada et al. | 702/191 |
| 6,505,135 B2 * | 1/2003 | Maginnis | 702/100 |
| 6,865,241 B1 * | 3/2005 | Adkins et al. | 375/372 |
| 2002/0004370 A1 | 1/2002 | Stengele | |
| 2004/0012265 A1 | 1/2004 | Burger | |
| 2004/0030532 A1 | 2/2004 | Boldt | |
| 2004/0243359 A1 * | 12/2004 | Ghaoud et al. | 702/189 |

FOREIGN PATENT DOCUMENTS

| | | |
|---|---|---|
| EP | 0 949 485 A2 | 10/1999 |
| JP | 4506410 | 11/1992 |
| JP | 07-199936 | 8/1995 |
| JP | 10-339656 | 12/1998 |
| JP | 2000-131118 | 5/2000 |
| WO | WO 91/08447 | 6/1991 |
| WO | WO 01/73383 A1 | 10/2001 |

OTHER PUBLICATIONS

Evaluation and Realization of Digital Phase Shift Technique.
The Closed Loop System of a Thermal Excited Silicon Microstructure Resonator Pressure Sensor and English translation attached.
Evaluation and Realization of Digital Phase Shift Technique and English translation attached.

* cited by examiner

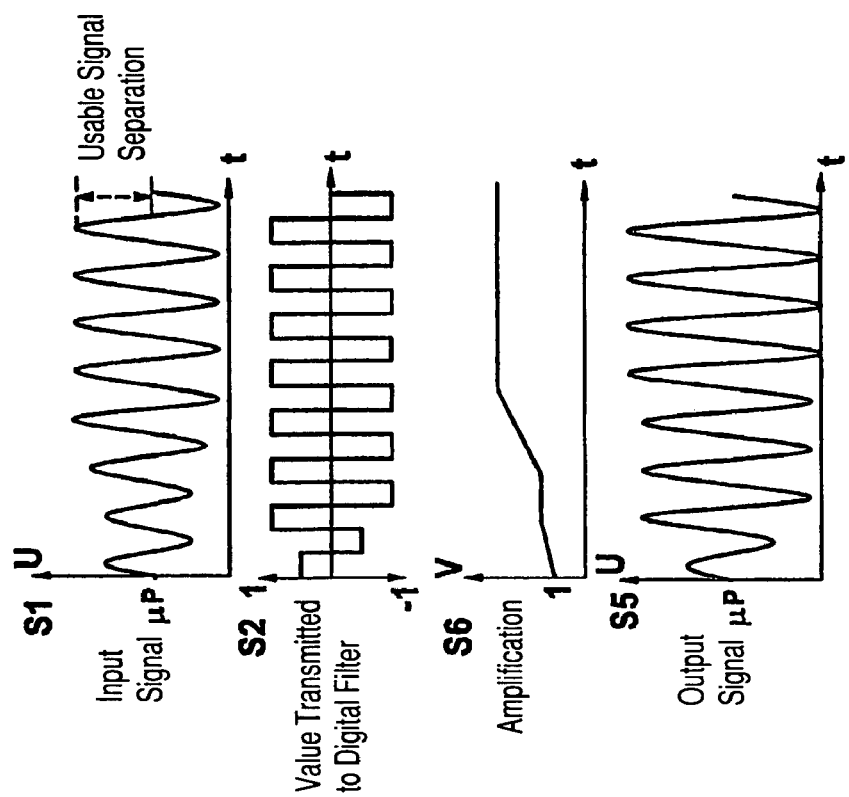
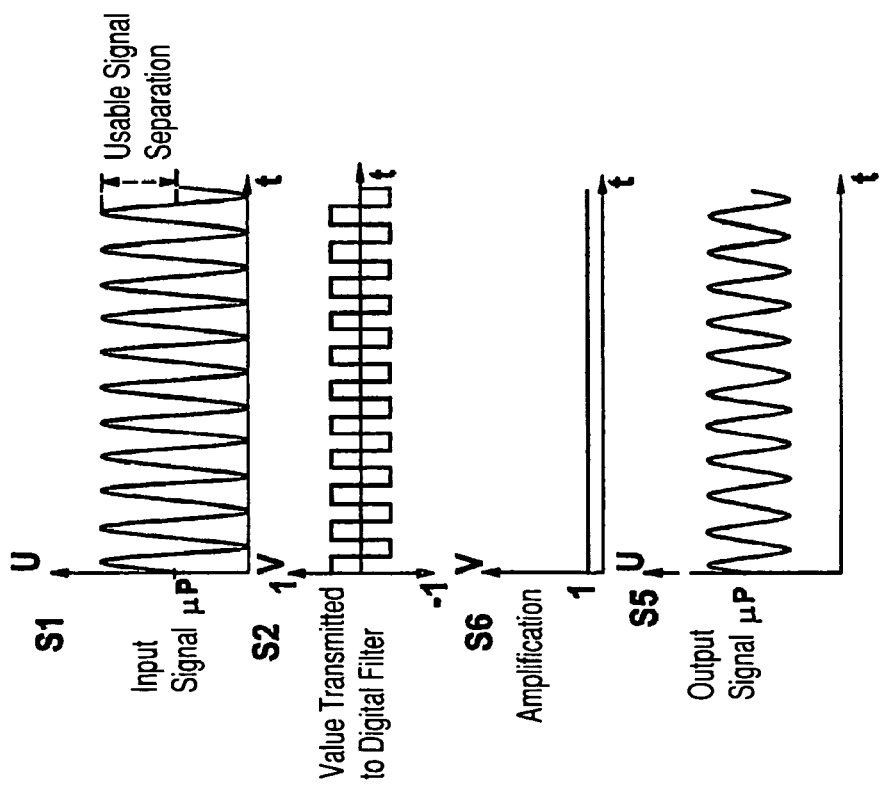

FIELD DEVICE ELECTRONICS WITH A SENSOR MECHANISM FOR PROCESS MEASUREMENT

FIELD OF THE INVENTION

The invention relates to field device electronics with a sensor unit for process measurements, wherein the field device electronics is connected with a sensor unit over corresponding signal paths, and receives analog measurement signals of the sensor unit and produces analog drive signals for the fundamental wave excitation of the sensor unit.

BACKGROUND OF THE INVENTION

Practically every sensor unit ever marketed for determining fill level in the case of liquids and bulk goods and for determining flow rate of a medium through a pipe system, operating based on electromechanical transducers (Vibronik), has used sinusoidal or rectangular, electrical, alternating voltage signals as drive signals for a fundamental wave excitation of the sensor units. The alternating signals are normally produced by means of an analog oscillator and analog filtered for further processing, rectified, and, in the case of limit level switches, compared by means of analog comparators with predetermined threshold values. Microprocessors are, as a rule, only used for linearizing, scaling and providing with time delays, switching hystereses, or inversions, the signals prepared by means of analog electronics.

The weakness of these sensor units shows itself in the case of accretion formation. In various media, e.g. cement, it is possible that a layer of the medium will cling to the sensor, while the fill level is still below the desired level. This layer can damp the oscillation of the sensor to such an extent that the electronics switches to the "covered" state. Furthermore, in the case of a sensor in the form of an oscillation fork, an unsymmetric accretion deposit can lead to transmission of the oscillation to the housing and the container. In this way, so much energy is withdrawn from the oscillation system, that it possibly can become completely damped. Such a behavior likewise leads to erroneous measurements.

SUMMARY OF THE INVENTION

An object of the invention is to provide a field device electronics for fundamental wave excitation of an oscillatable mechanical system, which electronics does its job with few components and nevertheless offers many possibilities for measurement signal processing, measurement signal preparation, and the compensation of disturbance variables.

This object is achieved by field device electronics having an analog/digital converter, a digital phase shifter, and a digital/analog converter, wherein the analog measurement signals are digitized by the analog/digital converter and forwarded to the digital phase shifter, and wherein an output signal of the phase shifter is converted by the digital/analog converter into the analog drive signal for the sensor unit.

A main idea of the invention involves applying digital signal processing methods and hardware for processing analog measurement signals for producing the drive signals for the sensor unit. To this end, the field device electronics of the invention for producing the drive signals includes an analog/digital converter, a digital phase shifter and a digital/analog converter, with the analog measurement signals being digitized by the analog/digital converter and fed to the phase shifter, and with the output signal of the phase shifter being converted by the digital/analog converter into the analog drive signal for the sensor unit.

In an especially advantageous embodiment of the invention, a digital filter unit is arranged between the analog/digital converter and the phase shifter for filtering the digitized measurement signal.

The phase shifter includes essentially a ring memory in whose memory locations the digitized and filtered values of the measurement are sequentially written. The phase shifting of the drive signal relative to the measurement signal is achieved by having a value issued from the ring memory be read from a memory location that is located a predeterminable number of memory locations before or after the memory location in which a currently read-in value is stored. In this connection, the predeterminable number of memory locations represents a certain phase shift angle. The phase shift angle produced by the predeterminable number of memory locations increment can be a constant value, which is determined after or before the start-up of the field device electronics and stored, or it can be a variable value, which is changeable as a function of the frequency and/or amplitude behavior of the measuring signal.

In an especially advantageous further development of the invention, a compensation of disturbance variables is also performed by methods and hardware of the digital signal processing. For registering such disturbance variables (for example an accretion formation on the sensor), the field device electronics includes additionally a frequency measurement for determining the frequency of the measurement signal. By evaluating the measured frequency of the measurement signal, a change of the resonance frequency of the system brought about by accretion formation is recognized. For compensating the disturbance variable, the field device electronics includes a regulatable amplifier, whose amplification factor is adjusted as a function of the determined resonance frequency of the system.

In one form of embodiment of the invention, the frequency measurement determines the frequency of the output signal of the analog/digital converter and the regulatable amplifier is arranged between the phase shifter and the digital/analog converter or between the digital filter and the phase shifter or between the phase shifter and the analog/digital converter, with the analog/digital converter being realized, for example, by a Schmitt-trigger function or by an analog comparator.

For evaluating the measurement signal and for producing an output signal representing a condition 'covered' or a condition 'not covered', the field device electronics includes an analog/digital converter and an average value builder and/or a frequency measurement. For evaluating amplitude changes, the analog/digital converter and the average value builder are used to produce the output signal. For evaluating frequency changes and for producing the output signal, the analog/digital converter and the frequency measurement are used.

In an advantageous embodiment of the invention, the sensor unit is provided in the form of an active electromechanical transducer and produces a measurement signal for determining and/or monitoring the fill level of a medium in a container.

In another advantageous embodiment of the invention, the active electromechanical transducer produces a measurement for determining or monitoring a flow rate of a medium flowing through a pipe system.

In further advantageous embodiments of the invention, the active electromechanical transducer is provided in the form of an oscillation fork or in the form of an oscillating rod, each of which includes a drive unit and a detector unit, with the detector unit producing the analog measurement signals and forwarding to the field device electronics, and with the drive signals of the field device electronics being transmitted to the drive unit. Also a single electromechanical transducer can be used, which simultaneously serves as drive- and detector-unit.

In an especially advantageous form of embodiment of the invention, the methods and hardware of the digital signal processing are realized by a microprocessor, with the associated programs for performing the functions using the microprocessor being stored in a storage unit. Preferably, the microprocessor performs the Schmitt-trigger function and/or the frequency measuring and/or the phase shifting and/or the amplifying and/or the average value formation and/or a comparator function and/or an amplification regulation and/or a producing of an output signal, wherein the digital/analog converter and/or the analog/digital conversion are integrated in the microprocessor.

BRIEF DESCRIPTION OF THE DRAWINGS

An example of an embodiment of the invention will now be explained in greater detail on the basis of the drawings, whose figures show as follows:

FIG. 5: which is a diagram of various signal curves at resonance frequency; and

FIG. 6: which is a diagram of various signal curves in the case of resonance frequency shifting.

DESCRIPTION OF THE PREFERRED EMBODIMENT

Figure 1:
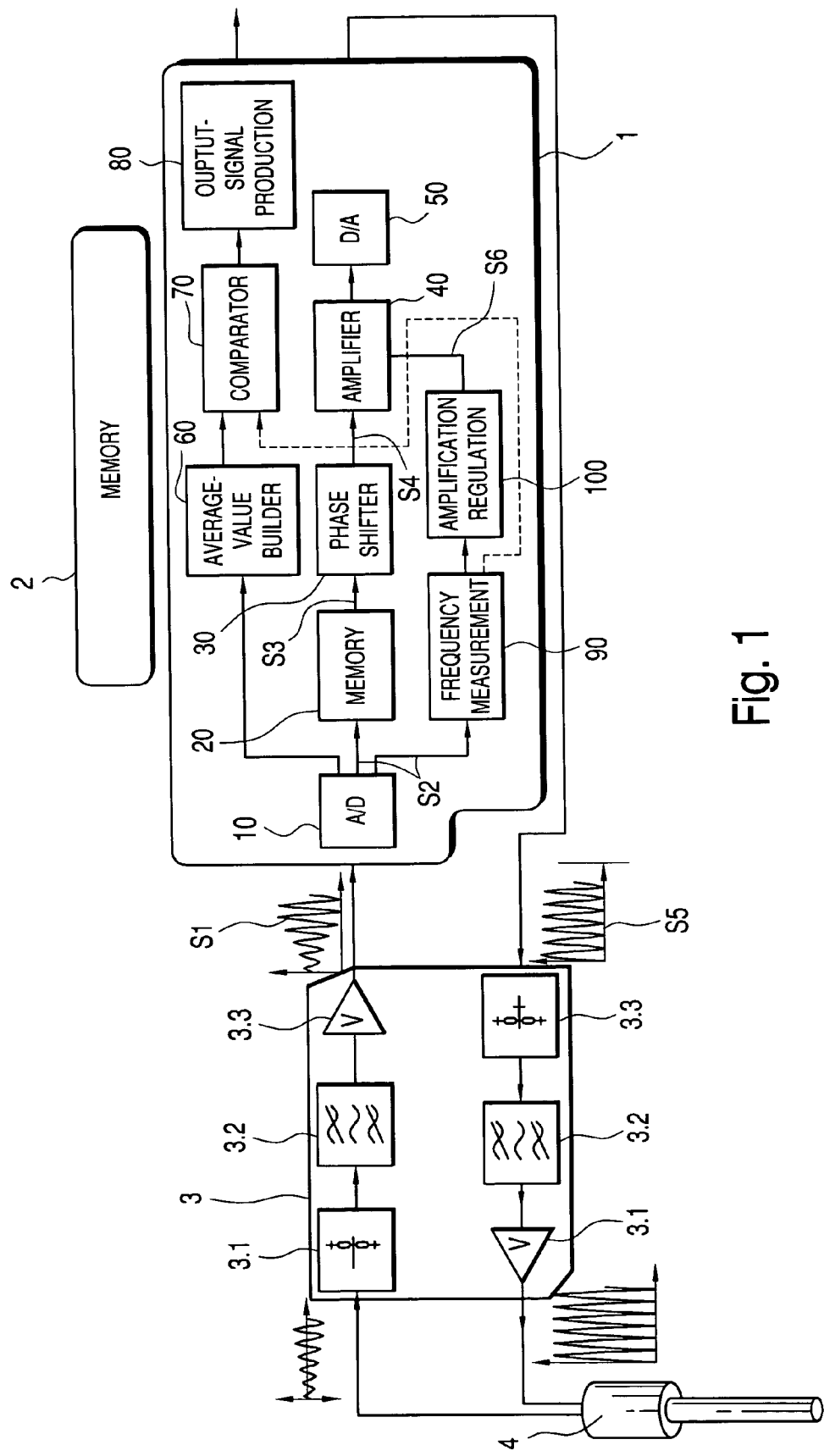
FIG. 1: which is a schematic drawing of a block diagram of a field device electronics.

As shown in FIG. 1, the field device electronics includes a microprocessor 1, a memory 2, an analog electronics 3 and a sensor 4. The sensor is embodied as an oscillatable, mechanical system.

The field device electronics uses fundamental wave excitation to make the oscillatable, mechanical system 4 oscillate for the purpose of implementing a field device for fill level measurement or for flow rate measurement. The essential principle of fundamental wave excitation is a known and proven method. New in the present instance is that a part of the filtering 20, the evaluation, the compensation of disturbance variables and a dynamic amplification algorithm associated therewith are embodied with methods and hardware of digital signal processing, with a microprocessor 1 preferably being used.

Additionally as shown in FIG. 1, an analog/digital converter 10 and a digital/analog converter 50 are integrated in the microprocessor 1. Moreover, the microprocessor executes the function blocks: digital filter 20, phase shifter 30, amplifier 40, average value builder 60, comparator 70, producing output signal 80, frequency measurement 90 and amplification regulation 100; the associated programs for executing the function blocks are stored in memory 2.

The oscillatable, mechanical system includes an oscillation element and corresponding exciting elements and detector elements. The oscillation element is embodied, for example, as an oscillation rod or oscillation fork having known resonance frequencies and is excited to oscillate using a piezoelectric element. A measurement signal resulting from these oscillations is detected by means of a detector element, for example an electromechanical transducer likewise embodied in the form of a piezoelectric element, and fed to an analog electronics 3 for processing. The analog electronics 3 includes two channels for signal transmission. One channel is the path from the sensor 4 to the microprocessor 1, the other the path from the microprocessor 1 to the sensor 4. The signals in both directions are, in each case, raised to a defined potential with an analog circuit 3.1, filtered by a bandpass filter circuit 3.2, and amplified by an alternating voltage amplifier stage 3.3. By the raising to a defined offset, the measurement signal S1 can be further processed with an unsymmetric supply voltage. The band pass filter circuit 3.2 prevents the transmission of interference frequencies.

The current value of the processed measurement signal S1 is read-in by an analog/digital converter 10 with constant sampling rate, with the minimum realizable sampling rate for the read-in of the analog values being larger than the resonance frequency of the sensor 4, at least by a factor of two. The analog/digital converter 10 converts the read-in, current, analog value into a digital value. This digital value lies, for example, between 0 and 255 in the case of a resolution of 8 bits. If the sensor is at rest, the value assumes the middle value of all possible values, thus 128 for a resolution of 8 bits. Thus, the analog/digital converter produces, again and again, from the preprocessed, analog signal S1 a digital signal, which can be processed by a microprocessor program, with the analog signal S1 being repeatedly read-in and digitized. The offset of the analog circuit 3.1 is adjusted such that it corresponds to the middle value of all analog values which the microprocessor 1 can recognize.

In the described advantageous form of embodiment of the invention, the measurement signal S1 is evaluated by a Schmitt-trigger function 11, which, in the illustrated example of an embodiment, is a part of the analog/digital converter 10. The Schmitt-trigger function 11 judges the direction of change relative to the middle value. This means that a value which is equal to, or higher than, the middle value (e.g., for a resolution of 8 bits, >=128) is transmitted to the subsequent function blocks as a positive constant and a value lying below the middle value (<128) is transmitted as a negative constant to the subsequent function blocks. In this way, the analog measurement signal S1 is converted into a rectangular signal S2, which is in phase with the analog measurement signal S1 and has an amplitude corresponding to the value of the constant. Consequently, the amplitude of the digital rectangular signal S2 is independent of the level of the analog signal S1 and always the same size.

Figure 2:
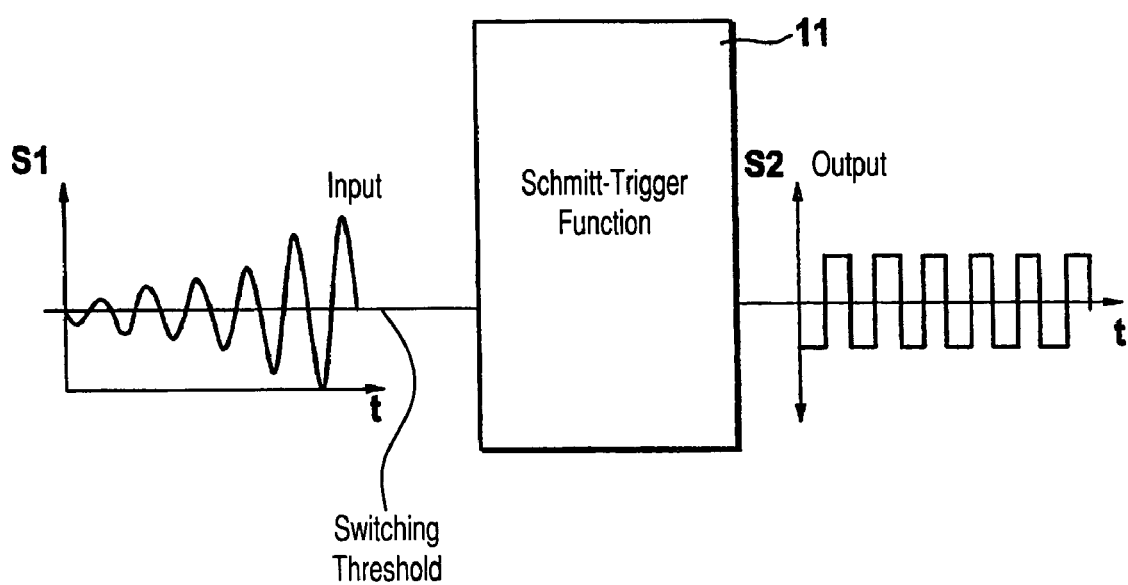
FIG. 2: which is a schematic drawing of the signal curves at the input and output of an analog/digital converter having a Schmitt-trigger function.

FIG. 2 shows the analog measurement signal S1 before execution of the Schmitt-trigger function 11 and the digital, rectangular signal S2 after execution of the Schmitt-trigger function 11. As can be seen from FIG. 2, a rectangular signal S2 of constant amplitude is produced independently of the amplitude of the measurement signal S1. The frequency of the rectangular signal S2 is equal to the frequency of the measurement signal. The real, digitized, analog value is transmitted to the average value formation 60.

Each new value of the rectangular signal S2 is forwarded to the digital filter 20. The digital filter 20 is preferably a filter of second order. The filtering prevents the transmission of error frequencies and an oscillation of the sensor 4 in a higher mode. Additionally, the digital filter 20 regenerates a sinusoidal signal S3 from the rectangular signal S2.

The values calculated by the filter function 20 are written, using the so-called first in, first out method, into a ring memory 31 (FIFO ring memory), which is part of the phase shifter 30. The ring memory size is fixed such that, at every point in time, the values of at least one entire oscillation period of the output signal S3 of the digital filter 20 is present. With that, it is possible to output the filtered signal S3 with phase shift. This happens in that one outputs not the current value from the ring memory 31, but rather a value stored in a memory location a predetermined number of memory locations before the memory location into which the current value is read in. The predeterminable number of memory locations then represents a certain phase shift angle. Since the frequency of the signal, because of the physics, can never change abruptly, a value subsequent by a constant angle corresponds approximately to the value which leads by the difference between the angle and 360 degrees. Thus, for example, if a period of the output signal S3 of the digital filter 20 is read into 360 memory locations, then the predetermined number of 270 memory locations represents a positive phase shifting of 90 degrees. By specifying how many memory locations lie between the output value and the last value read in, one has then set a phase shift angle between output signal S4 and input signal S3 of the phase shifter 30. In this way, it is possible to issue the output signal S4, and, consequently, the drive signal S5, with a settable phase shift with respect to the input signal S3 and, thus, with respect to the measurement signal S1.

FIG. 3 shows producing the phase shift by use of a ring memory 31.

Figure 3A:
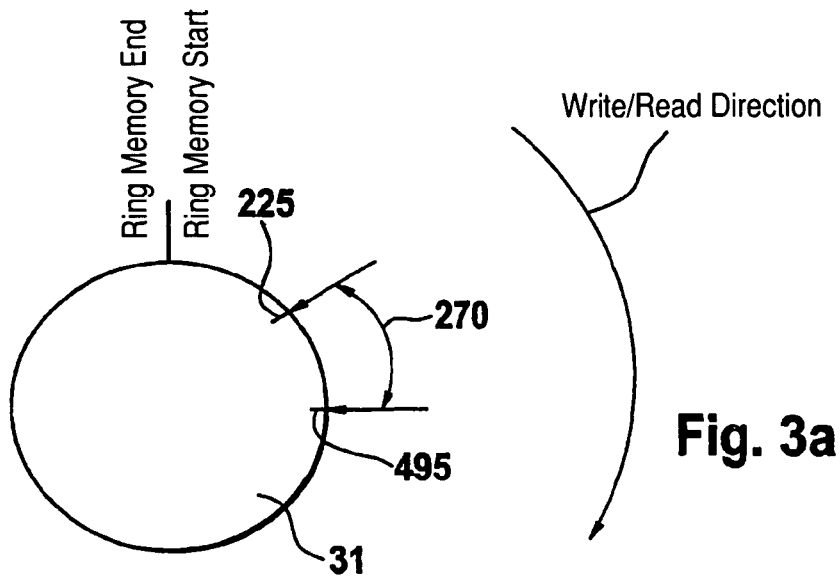
FIGS. 3a-3c: which are schematic diagrams of an implementation of a digital phase shifting.

As can be seen in FIG. 3a, the pointer for read-in of the current value is pointing to memory location 495, while the pointer for the current output value is at memory location 225. Thus, the current output value is located 270 memory cells before the current input value, and the predeterminable number of memory cells in this example is 270.

Figure 3B:
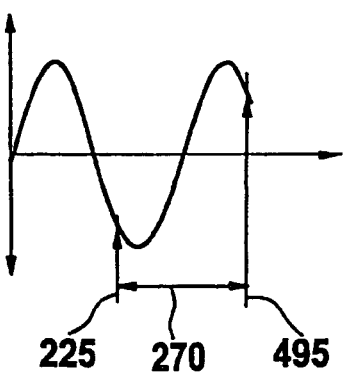

FIG. 3b shows the momentary memory contents of the ring memory. In the illustrated example, an oscillation period is stored in 360 memory cells.

Figure 3C:
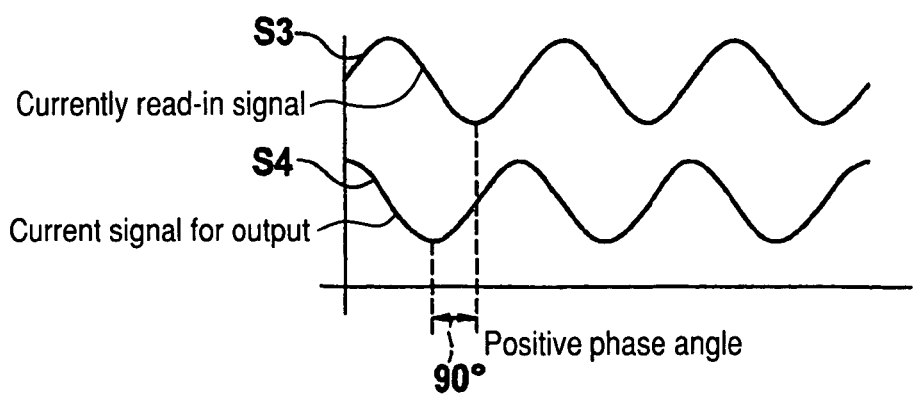

FIG. 3c shows in one diagram the input signal S3 and the output signal S4 of the phase shifter. As can be seen from this diagram, the output signal S4 leads the input signal S3 in the illustrated example by 90 degrees. Thus, the predetermined number of 270 memory cells in the illustrated embodiment corresponds to a phase shift of 90 degrees.

The value read from the phase shifter 30 is multiplied by the current amplification factor S6 of the amplifier and output as the drive signal S5 through the digital/analog converter 50. The drive signal S5 is now likewise processed and amplified by the analog electronics 3. The signal resulting therefrom is forwarded to an electromechanical transducer and the eigenoscillation, i.e. natural oscillation, of the sensor 4 is reinforced. In this manner, an electromechanical resonant circuit arises and therewith an oscillation growing to a maximum possible amplitude. Consequently, the oscillatable, mechanical system is excited to oscillate using its own fundamental wave signal advanced by the amount of the phase shift. The electromechanical transducer can, for example, be embodied as a piezoelement and is mounted at a suitable location in the sensor.

The signal produced by the sensor 4 is an alternating voltage signal. So long as the sensor is in the rest condition, thus not oscillating, the amplitude of the signal is approximately zero. However, even the minimal movements, which the sensor executes even in the rest condition, are sufficient to produce a signal change, which is recognized by the microprocessor 1. Therewith, an oscillation event is excited.

The resonance frequency of the oscillation system 4 is continuously measured and evaluated. In this way, the frequency changes brought on by accretion formation are recognized. In the case of a frequency shift indicating an accretion, a processor-internal amplification factor S6 is readjusted for an amplifier stage 40, in order, in this way, to match the oscillation amplitude of the oscillation element to the accretion formation. Additionally, the evaluation of a frequency change in the case of use in liquids permits a decision as to whether the oscillation system is covered or not.

Cyclically, an average value calculation for the amplitude 60 and a measurement signal evaluation are performed. The evaluation of the average value permits a judgement as to whether the sensor is covered or not.

The amplitude and the frequency of the input signal S1 in the microprocessor 1 give information concerning the situation regarding covering that the sensor 4 is experiencing at the moment. This evaluation occurs by way of an average value calculation 60 for the absolute values of one or more periods. If the sensor 4 immerses in the medium to be measured, the damping increases and the amplitude and usually also the frequency of the signals decreases. The evaluation of the average value and/or the frequency advises of this condition and can trigger a reaction, e.g. an alarm signal. In the illustrated embodiment, the evaluation proceeds using a comparator 70, which compares the current values of the average of the absolute values and/or the resonance frequency with predetermined values, and generates an appropriate signal ('covered' or 'not covered'). From this comparator signal, an output signal is produced in the function block 80, with also execution of any needed adjustment (scaling, inverting, etc.) of the output signal for its transfer to a superordinated unit.

The function block 80 produces an output signal as a function of the further use of the output signal, respectively the used transmission protocol. Thus, for example, a 4-20 mA signal, a 0-10V signal, a PFM signal (pulse frequency modulation signal), a binary switching signal, or a digital code, etc. can by produced. It is, however, also imaginable that the function block 80 produces and outputs a plurality of output signals (4-20 mA, 0-10V, PFM signal, binary switching signal, etc.) for different transmission protocols, respectively application purposes. For producing certain standardized output signals, a digital/analog converter can be part of the function block 80, or such can be implemented as its own function block.

If the sensor 4 is damped not by immersion in the medium to be measured but by accretion, there is a further effect, in addition to the decrease in the signal amplitudes; the resonance frequency of the system changes. Since the oscillation is produced based on the principle of fundamental wave excitation, the sensor 4 and all signals adjust to this changed frequency. Two effects can cause a decrease in the signal amplitude in the case of accretion; on the one hand, the sensor 4 is damped by the friction of the accretion, while, on the other hand, an unsymmetrical accretion can result in a portion of the oscillation energy being transferred to the container. A sensitively adjusted evaluation would report "covered". The present method recognizes, in contrast, such a frequency change to be due to accretion formation. Following subceeding of, i.e. falling below, a constant tolerance value (threshold minimum amplitude), the processor-internal signal amplification S6 is increased. This happens by the increasing of a factor, with which the current value of the output is multiplied, as long as the average value of the absolute input signal values lies below a constant value (threshold minimum amplitude). From this, an increase of the loop gain of the system occurs, in proportion to the decrease of the resonance frequency. The oscillation is amplified and the effect of the resonance frequency shift on the signal amplitudes is compensated. The average value of the absolute input signal remains above the threshold, which marks the condition "covered", whereby an erroneous measurement is prevented.

Figure 4A:
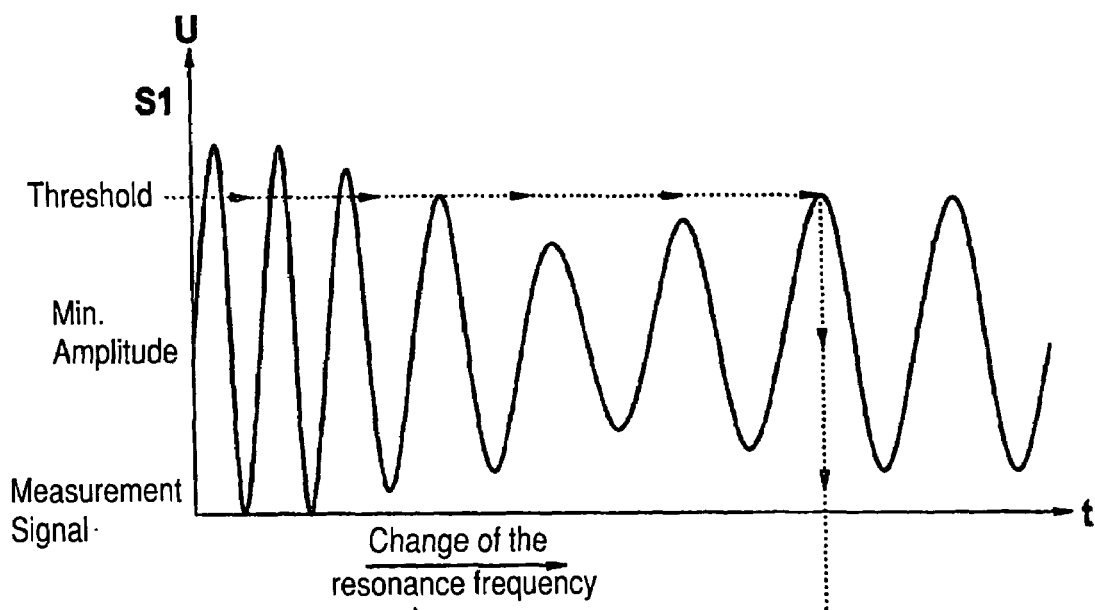
FIGS. 4a-4b: which are diagrams of the input signal and the amplification factor in the case of an amplification readjustment.
Figure 4B:
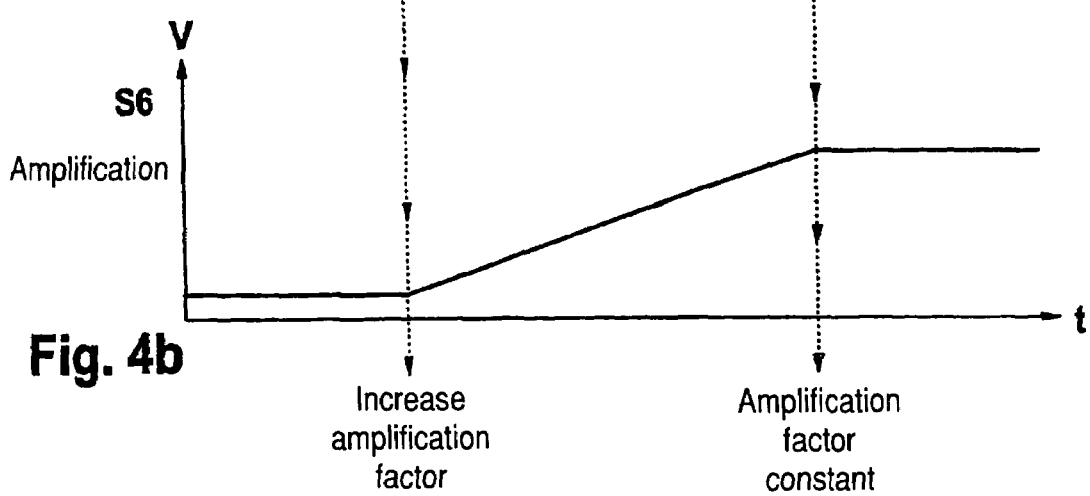

FIG. 4 shows the described relationship between the resonance frequency shift in the case of the input signal S1 (upper diagram) and the amplification factor (lower diagram) adjusted by the amplification regulation 100. The amplification factor S6 is increased in this case for so long, until the threshold of a minimum amplitude is again reached.

FIGS. 5 and 6 show the signal curves of the measurement signal S1, the output signal S2 of the Schmitt-trigger function, respectively the transmitted signal S2, to the digital filter 20, the amplification factor S6 and the drive signal S5, with FIG. 5 showing the signal curves at resonance frequency and FIG. 6 the signal curves for the case of changed resonance frequency.

The method is further improved by a processor-internal damping of the basic amplification. The basic amplification is the factor with which the arriving analog measurement signals S1 are evaluated at the processor input. The Schmitt-trigger function 11 is so adjusted, that it does not transmit the maximum possible value, e.g. 256 in the case of 8 bits, as the absolute value for arriving signals, i.e. for the amplitude of the rectangular signal S2. Instead, the value is set to a size, e.g. 128 in the case of 8 bits, which gives a definite amplitude, without changing the amplitude factor, by frequency shift at the sensor 4. This amplitude corresponds approximately to the same amplitude, which the sensor 4 can achieve with maximum amplification in the case of a realistically possible accretion formation. In the diagram (S2 in FIGS. 5 and 6), the illustrated signals are normalized on the maximum value (e.g. 256 in the case of 8 bits), i.e. the basic amplification in FIG. 5 is 0.5 and that in FIG. 6 is 1. In spite of this damping of the basic amplification, enough range remains for a high measurement sensitivity of the total system. If a large frequency change of the system due to accretion formation is recognized (seethe measurement signal S1 in FIG. 6), the internal damping is withdrawn and the amplitude of the rectangular signal S2 is transmitted with the factor 1 (see 52 in FIG. 6). With that, the amplitude of the excitation (drive signal S5 in FIG. 6) increases abruptly, whereby the damping of the mechanical oscillation is counteracted. This effect and the commensurate increasing of the internal amplification factor S6 (compare S6 in FIGS. 5 and 6) yield a readjustment of the amplification behavior with PI-similar character, that is the feature of the field device electronics lead to a readjustment of the amplification which is done in a proportional-integral control like manner. Hence, the behaviour of the readjustment has a PI-control-similar character.

The fact, that the amplitude in the uncovered case without accretion is about equally as large as the amplitude which gets set with the help of the readjustment in the case of accretion formation, has a further positive effect. This equalization makes it possible that, in both cases, with and without accretion, the sensitivity of the measurement remains constant, since the usable signal separation is equally large.

The invention claimed is:

1. Field device electronics connected with a sensor unit for process measurements, wherein the connection exists over corresponding signal paths, and wherein analog measurement signals (S1) of the sensor unit are received and wherein analog drive signals (S5) are produced for the fundamental wave excitation of the sensor unit and wherein said analog drive signals (S5) are transmitted to the sensor unit (4), comprising:

an analog/digital converter for producing the analog drive signal (S5),
a digital phase shifter;
and a digital/analog converter, wherein:
said sensor unit is embodied as an active electromechanical transducer;
said active electromechanical transducer produces an analog measurement signal (S1) for determining and/or monitoring a fill level of a medium in a container;
the analog measurement signals (S1) are digitalized by said analog/digital converter and forwarded to said digital phase shifter, and an output signal (S4) of said digital phase shifter is converted by said digital/analog converter into the analog drive signal (S5) for the sensor unit;
said digital phase shifter includes a ring memory;
the values of the analog measurement signal (S1) are written sequentially into memory locations of said ring memory;
the phase shift of the drive signal (S5) with respect to the analog measurement signal (S1) is achieved by reading a value, which is output from said digital phase shifter, out of a memory location of said ring memory which is located a predeterminable number of memory locations before or after the memory location in which a currently read-in value is store;
said active electromechanical transducer is embodied as an oscillating fork having a drive unit and a detector unit, said detector unit produces the analog measurement signals (S1) and feeds them to the field device electronics, and the analog drive signals (S5) are transmitted from the field device electronics to said drive unit; and
the predeterminable number of memory locations represents a determined phase shift angle.

2. The field device electronics as claimed in claim 1, wherein:
said predeterminable number of memory locations for producing said phase shift angle is a constant value.

3. The field device electronics as claimed in claim 1, wherein:
said predeterminable number of memory locations for producing said phase shift angle is a variable value, which depends on frequency and/or amplitude behavior of the analog measurement signal S1.

* * * * *